United States Patent
Weston et al.

(10) Patent No.: US 12,528,488 B2
(45) Date of Patent: Jan. 20, 2026

(54) SYSTEMS AND METHODS FOR PERFORMING REMEDIAL ACTIONS WHEN A ROAD IS FLOODED

(71) Applicant: Ford Global Technologies, LLC, Dearborn, MI (US)

(72) Inventors: Keith Weston, Canton, MI (US);
Jonathan Hair, Northville, MI (US);
Eliza Rose Bifano, Avon, CT (US);
Matthew Penne, Pierce, NE (US);
Michael Alan Mcnees, Flat Rock, MI (US)

( * ) Notice: Subject to any disclaimer, the term of this patent is extended or adjusted under 35 U.S.C. 154(b) by 0 days.

(21) Appl. No.: 18/435,777

(22) Filed: Feb. 7, 2024

(65) Prior Publication Data
US 2025/0249919 A1    Aug. 7, 2025

(51) Int. Cl.
*B60W 50/14* (2020.01)
*B60W 30/14* (2006.01)
(Continued)

(52) U.S. Cl.
CPC .......... *B60W 50/14* (2013.01); *B60W 30/146* (2013.01); *G01C 21/3415* (2013.01); *G06V 20/582* (2022.01); *G06V 20/588* (2022.01)

(58) Field of Classification Search
CPC .............. B60W 40/06; B60W 50/14; B60W 2050/143; B60W 30/146; G01S 17/88; G01S 13/931; G01S 15/88; G01S 15/931; G01C 21/3415; G06V 20/582; G06V 20/588
(Continued)

(56) References Cited

U.S. PATENT DOCUMENTS

| 11,776,376 B2 * | 10/2023 | Avery ................... G08B 21/20 340/601 |
| 2004/0036601 A1 * | 2/2004 | Obradovich ........ H04L 61/2553 340/425.5 |

(Continued)

FOREIGN PATENT DOCUMENTS

| CN | 205131084 U | 4/2016 |
| CN | 112419689 A | 2/2021 |

OTHER PUBLICATIONS

Melchizedek I. Alipio, et. al., Vehicle Traffic and Flood Monitoring With Reroute System Using Bayesian Networks Analysis, 2017 IEEE 6th Global Conference on Consumer Electronics, Dec. 21, 2017, pp. 1-5.

*Primary Examiner* — Eric Blount
(74) *Attorney, Agent, or Firm* — Frank Lollo; Eversheds Sutherland (US) LLP

(57) ABSTRACT

A vehicle including a detection unit and a processor is disclosed. The detection unit may be configured to capture inputs associated with a road in proximity to the vehicle. The processor may be configured to detect a presence of a fluid on the road and a presence of an object in proximity to the fluid based on the inputs captured by the detection unit. The processor may further determine at least one of an object height or an object distance from the vehicle based on the inputs, and calculate a fluid depth on the road based on the object height and/or the object distance. The processor may further perform a predefined action responsive to determining that the fluid depth may be greater than a predefined depth threshold.

18 Claims, 5 Drawing Sheets

(51) Int. Cl.
  *G01C 21/34* (2006.01)
  *G06V 20/56* (2022.01)
  *G06V 20/58* (2022.01)
(58) Field of Classification Search
  USPC ..................................................... 340/425.5
  See application file for complete search history.

(56) References Cited

U.S. PATENT DOCUMENTS

| | | | |
|---|---|---|---|
| 2018/0073879 A1* | 3/2018 | Hakeem | G01C 21/3415 |
| 2018/0348753 A1* | 12/2018 | Ortiz Gonzalez | B60W 40/02 |
| 2021/0272440 A1* | 9/2021 | Faizan | B60W 40/06 |
| 2025/0054390 A1* | 2/2025 | Handiganoor | H04W 4/38 |
| 2025/0065900 A1* | 2/2025 | Gideon | B60W 60/001 |

* cited by examiner

SYSTEMS AND METHODS FOR PERFORMING REMEDIAL ACTIONS WHEN A ROAD IS FLOODED

FIELD

The present disclosure relates to systems and methods for facilitating a vehicle operator or a vehicle to perform remedial actions when a road on which the vehicle is travelling may include flooded patches.

BACKGROUND

There are known instances of road segments getting flooded during heavy rains or inclement weather conditions. If a road segment does not have proper drainage, the level of water on the road may breach acceptable levels, which may cause inconvenience to the drivers who may be driving their vehicles on the road. Furthermore, vehicle performance may get affected if the vehicles are driven through flooded roads. Currently, there are limited means for a driver to know whether the water level on the road is greater or less than an acceptable level for vehicle driving.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
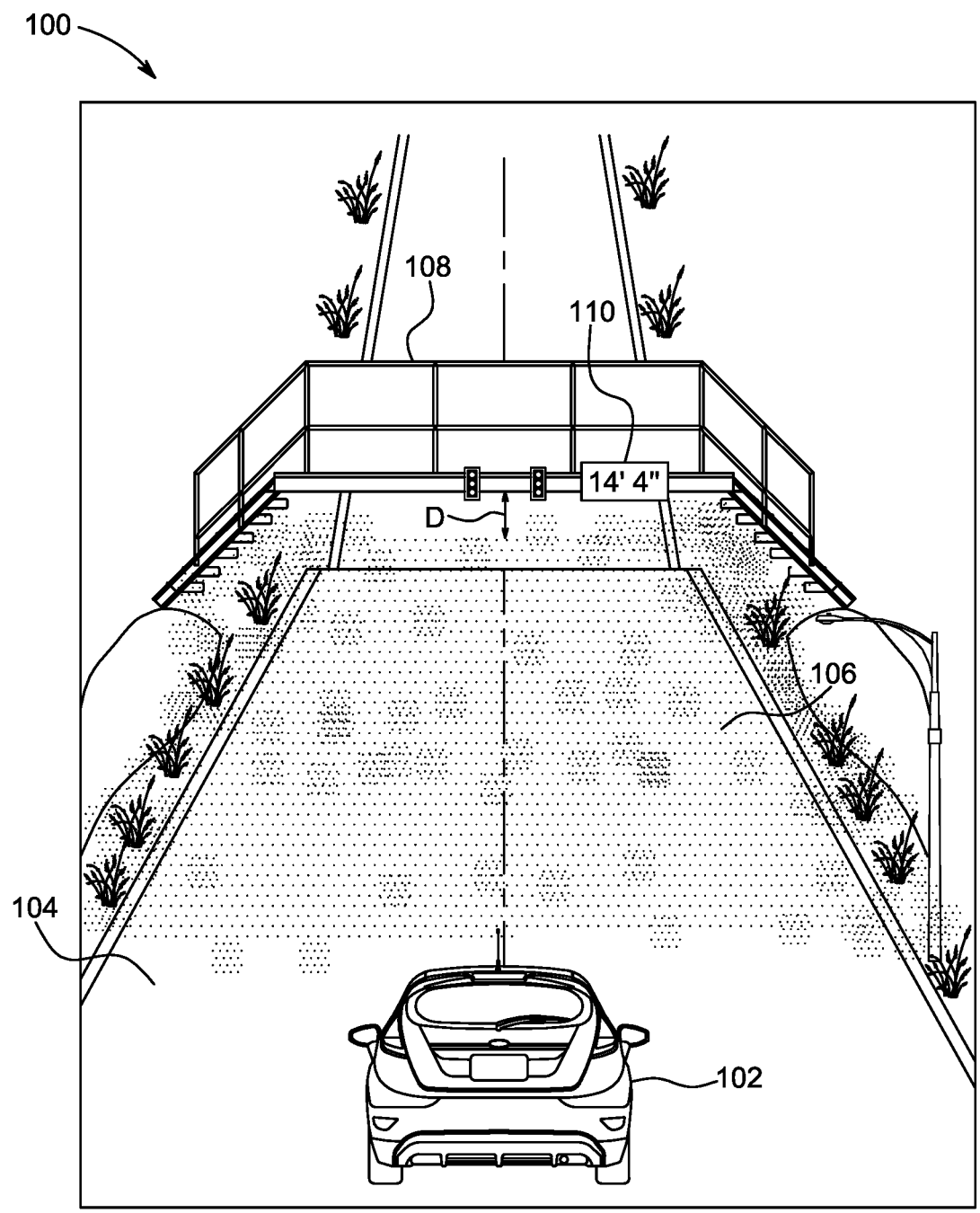
FIG. 1 depicts an example environment in which techniques and structures for providing the systems and methods disclosed herein may be implemented.

The present disclosure describes a vehicle (e.g., a first vehicle) configured to facilitate vehicle navigation through flooded road patches/segments. Specifically, the vehicle may be configured to perform remedial actions when a road on which the vehicle is travelling may include flooded patches. The vehicle may include a detection unit or one or more vehicle exterior cameras that may be configured to capture images of a road on which the vehicle may be travelling. The vehicle may be configured to detect a presence of water on the road and a presence of an object in proximity to the water, based on the images captured by the vehicle exterior cameras. Responsive to detecting the object presence, the vehicle may determine an object height and/or an object distance from the vehicle, based on the captured images. The vehicle may further calculate a water depth on the road based on the determined object height and/or the object distance. Responsive to calculating the water depth, the vehicle may perform one or more first remedial actions when the water depth may be greater than a predefined depth threshold, and perform one or more second remedial actions when the water depth may be less than the predefined depth threshold.

In an exemplary aspect, the object may be an overpass bridge located over/above the water on the road. In this case, the vehicle may determine a distance between an overpass bridge bottom portion and a water level top portion based on the captured images, and then calculate the water depth by subtracting the distance from the object/overpass bridge height. In another exemplary aspect, the vehicle may calculate the water depth based on the object/overpass bridge distance from the vehicle and a road inclination angle associated with the flooded road patch.

In yet another exemplary aspect, the object may be another vehicle (or a second vehicle) that may be travelling through the flooded road patch. In this case, the vehicle may determine a distance between a second vehicle top portion and the water level top portion based on the captured images, and then calculate the water depth by subtracting the distance from the second vehicle height.

In some aspects, as part of the first remedial action (i.e., when the water depth may be greater than the predefined depth threshold), the vehicle may autonomously stop vehicle movement and/or output a vehicle stop notification on a user device associated with a vehicle operator and/or a vehicle Human-Machine Interface (HMI). Further, the vehicle may autonomously reduce a vehicle speed and/or recommend an alternative route to a vehicle's destination location that prevents the vehicle movement through the flooded road patch.

In further aspects, as part of the second remedial action (i.e., when the water depth may be less than the predefined depth threshold), the vehicle may output a user caution notification to the user device and/or the vehicle HMI, audibly output a predefined portion/section of a vehicle's owner manual including best practices of driving through flooded roads, and/or limit the vehicle speed to an optimal speed based on the calculated water depth. In this case also, the vehicle may autonomously reduce the vehicle speed.

The vehicle may perform one or more additional actions to assist other vehicles that may be located on the road. For example, the vehicle may transmit/broadcast a notification indicating the water presence on the road and/or the calculated water depth to the other vehicles, and/or inform authorities or rescue teams when a vehicle (e.g., a third vehicle) may be submerged in the flooded road patch.

The present disclosure discloses a vehicle that facilities vehicle navigation through a flooded road patch. The vehicle performs remedial actions based on the water depth on the road, thereby enabling the vehicle operator to conveniently navigate the flooded road patch or prevent vehicle movement through the flooded road patch. The vehicle additionally informs rescue teams when one or more other vehicles may be stuck or submerged in the flooded road patch.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 (or a "first vehicle") that may be travelling on a road segment 104 (or a road 104). The vehicle 102 may take the form of any passenger or commercial vehicle such as, for example, a car, a work vehicle, a crossover vehicle, a truck, a van, a minivan, a taxi, a bus, etc. Further, the vehicle 102 may be a manually driven vehicle, and/or may be configured to operate in a fully autonomous (e.g., driverless) mode or a partially autonomous mode, and may include any powertrain such as, for example, a gasoline engine, one or more electrically-actuated motor(s), a hybrid system, etc.

In some aspects, the road 104 may include one or more road patches that may be flooded with fluid or water 106, as shown in FIG. 1. In the exemplary aspect depicted in FIG. 1, the road patch that is flooded is located in front of the vehicle 102. Stated another way, the vehicle 102 may be travelling towards the flooded road patch.

The vehicle 102 may be configured to calculate a water depth on the road 104 when the vehicle 102 may be travelling towards the flooded road patch, and perform one or more predefined remedial actions based on the calculated water depth to facilitate vehicle navigation through the flooded road patch or recommend a vehicle operator not to pass through the flooded road patch. The vehicle 102 may implement one or more different approaches to calculate the water depth, as described below.

Figure 2:
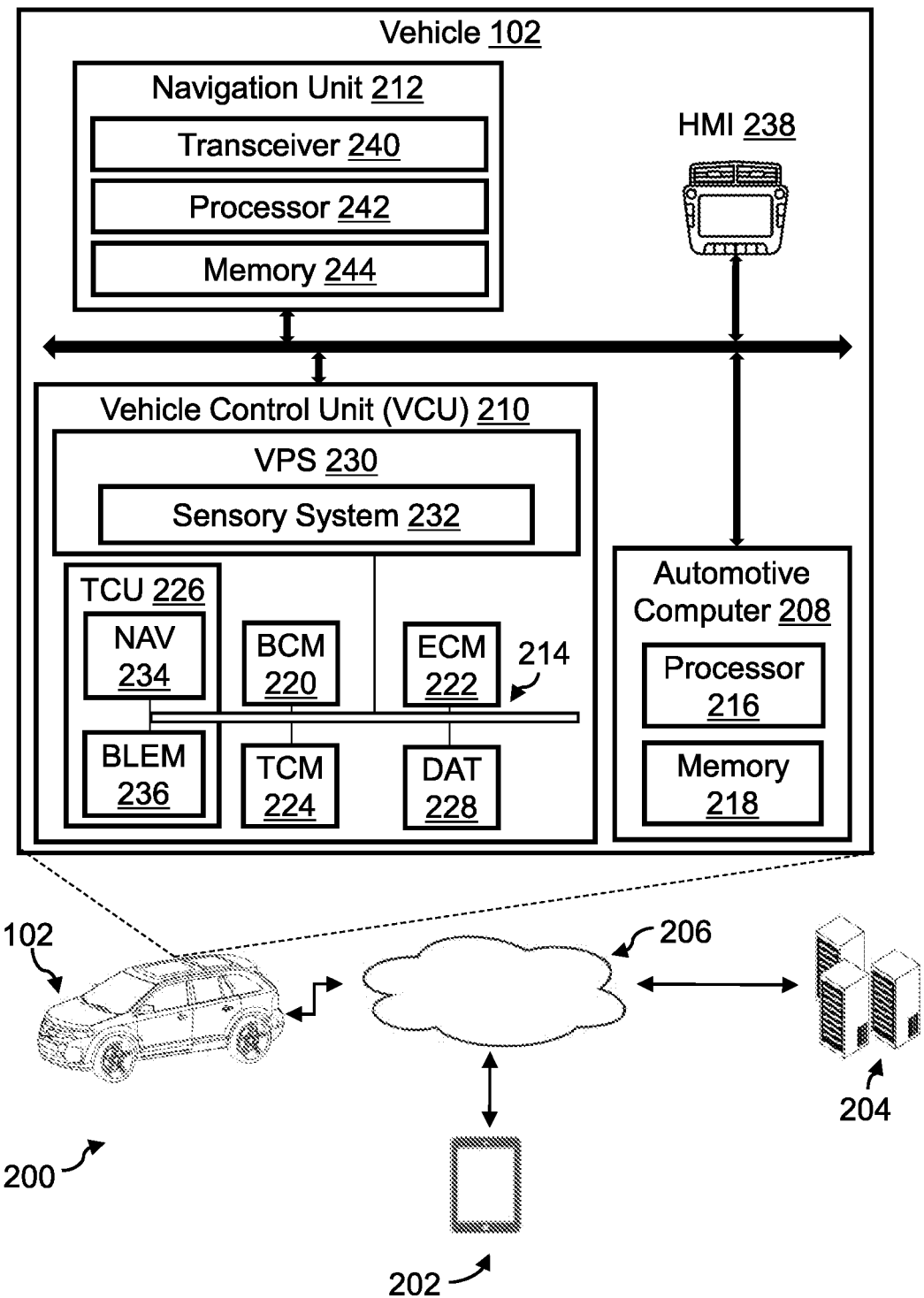
FIG. 2 depicts a block diagram of an example system for facilitating vehicle navigation through a flooded road in accordance with the present disclosure.

In one exemplary approach, the vehicle 102 may first determine a presence of an object in proximity to or in the water 106 based on inputs obtained from a vehicle detection unit (shown as vehicle sensory system 232 in FIG. 2). For example, the vehicle 102 may determine a presence of an overpass bridge 108 disposed over or above the flooded road patch, as shown in FIG. 1. In some aspects, the vehicle detection unit may include vehicle exterior cameras, and the inputs obtained from the vehicle detection unit may include images captured by the vehicle exterior cameras.

Responsive to determining an overpass bridge presence above the flooded road patch, the vehicle 102 may determine an overpass bridge height by performing image processing/analysis of image(s) captured by the vehicle detection unit of a bridge height signage 110 that may be disposed on the overpass bridge 108, as shown in FIG. 1. As an example, the vehicle 102 may determine that the overpass bridge height may be 14 feet and 4 inches, when the bridge height signage 110 reads 14' 4". The vehicle 102 may further determine a distance "D" between an overpass bridge bottom portion and a water top level/portion based on the image processing/analysis, as shown in FIG. 1. The vehicle 102 may then calculate the water depth by subtracting the distance "D" from the overpass bridge height.

In another exemplary approach, the vehicle 102 may calculate the water depth based on a distance between the vehicle 102 and the overpass bridge 108 (determined based on the image processing/analysis and/or inputs obtained from vehicle's radar sensors, lidar sensors, and/or the like) and a road inclination angle (when, e.g., the vehicle 102 may be located at an edge of the flooded road patch). The process of calculating the water depth based on the distance between the vehicle 102 and the overpass bridge 108, and the road inclination angle is described below in detail in conjunction with FIGS. 2 and 3.

In yet another exemplary approach, the vehicle 102 may calculate the water depth based on images of another vehicle (e.g., a second vehicle, not shown) that may be travelling through the flooded road patch. In this case, the vehicle 102 may first analyze the second vehicle's images when the second vehicle may be outside the flooded road patch (e.g., when the second vehicle may be about to enter the flooded road patch) to determine the second vehicle's height. The vehicle 102 may then analyze the second vehicle's images when the second vehicle may be travelling through the flooded road patch to determine a distance between the second vehicle's top portion and a water top level/portion. The vehicle 102 may then calculate the water depth by subtracting the determined distance from the second vehicle's height. The process of calculating the water depth based on the second vehicle's height is described below in detail in conjunction with FIGS. 2 and 4.

The approaches described above for calculating the water depth are exemplary in nature and should not be construed as limiting. The vehicle 102 may calculate the water depth by implementing other approaches not described herein, without departing from the present disclosure scope.

Responsive to calculating the water depth, the vehicle 102 may determine whether the water depth may be greater or less than a permissible vehicle navigation threshold (or a predefined depth threshold, e.g., 37 or 39 inches) associated with the vehicle 102. The vehicle 102 may perform one or more first predefined actions when the water depth may be greater than the predefined depth threshold, and perform one or more second predefined actions when the water depth may be less than the predefined depth threshold.

In some aspects, the first predefined actions may include outputting a first recommendation to a user device (shown as user device 202 in FIG. 2) associated with a vehicle operator or a vehicle Human-Machine Interface ("HMI", shown as HMI 238 in FIG. 2) requesting the vehicle operator not to navigate through the flooded road patch, outputting a second recommendation to the user device or the vehicle HMI including an alternative route (that prevents travel through the flooded road patch) to a vehicle's destination location, autonomously stopping vehicle movement as the vehicle 102 approaches the flooded road patch, and/or the like. By performing the first predefined action(s), the vehicle 102 may prevent the vehicle movement through the flooded road patch, thereby preventing the vehicle 102 and/or the vehicle operator from any adverse situation.

The second predefined actions may include, for example, outputting an alert notification on the user device or the HMI requesting the vehicle operator to exercise caution while travelling through the flooded road patch (as the patch may include submerged objects), limiting vehicle speed to a maximum permissible vehicle speed in flooded conditions based on the water depth, outputting audibly on the user device or the HMI those sections of vehicle's user/owner manual that include best practices of driving through flooded roads, and/or the like. By performing the second predefined action(s), the vehicle 102 may facilitate the vehicle operator to conveniently navigate the flooded road patch, without adversely affecting the vehicle's performance.

The vehicle 102 may perform one or more additional actions when the vehicle 102 detects the water presence on the road 104 (irrespective of the water depth). Examples of such additional actions include, but are not limited to, disabling vehicle's cruise control feature, reducing vehicle speed, transmitting/broadcasting a notification indicating the water presence on the road 104 and the calculated water depth to other vehicles/user devices that may be located on the road 104, and/or the like. Such additional actions may prevent the vehicle 102 and/or the vehicle operator (and other vehicles on the road 104) from experiencing any adverse situation due to the flooded road patch.

In some aspects, the vehicle 102 may further output notifications or recommendations on the user device or the HMI that may be received from one or more external servers (e.g., associated with Government agencies). Such notifications or recommendations may include preset messages (e.g., "Turn around", "Don't drive through this road", etc.) that the Government agencies may desire the vehicle operators driving on the road 104 to hear/view. In further aspects, the vehicle 102 may perform the first predefined action even when the water depth may be less than the predefined depth threshold, when, e.g., the water current on the road 104 may be fast enough to wash the vehicle 102 away or the road may have washed away under the water that is being measured.

Further vehicle details are described below in conjunction with FIG. 2.

The vehicle 102 implements and/or performs operations, as described here in the present disclosure, in accordance with the owner manual and safety guidelines. In addition, any action taken by the vehicle operator based on recommendations or notifications provided by the vehicle 102 should comply with all the rules specific to the location and operation of the vehicle 102 (e.g., Federal, state, country, city, etc.). The recommendations or notifications, as provided by the vehicle 102, should be treated as suggestions and only followed according to any rules specific to the location and operation of the vehicle 102.

FIG. 2 depicts a block diagram of an example system 200 for facilitating vehicle navigation through a flooded road in accordance with the present disclosure. While describing FIG. 2, references will be made to FIGS. 3 and 4.

The system 200 may include the vehicle 102, a user device 202, and one or more servers 204 (or server 204) communicatively coupled with each other via one or more networks 206 (or network 206). The user device 202 may be associated with the vehicle operator/user of the vehicle 102, and may be, for example, a mobile phone, a laptop, a computer, a tablet, a smartwatch, a wearable device, or any other device with communication capabilities.

The server 204 may be part of a cloud-based computing infrastructure and may be associated with and/or include a Telematics Service Delivery Network (SDN) that provides digital data services to the vehicle 102 and other vehicles (not shown) that may be part of a vehicle fleet. In further aspects, the server 204 may be configured to store vehicle information associated with the vehicle 102, and may be configured to transmit the vehicle information to the vehicle 102 at a predefined frequency or when the vehicle 102 transmit a request to the server 204 to obtain the vehicle information. The vehicle information may include, for example, the permissible vehicle navigation threshold or the predefined depth threshold of water on the road 104 through which the vehicle 102 may travel (without adversely affecting vehicle's performance), a mapping of maximum permissible vehicle speeds in flooded road conditions with different water depths, and/or the like. In additional aspects, the server 204 may be associated with a firm that may perform repair or maintenance of vehicles, or rescue vehicles submerged in water. In yet another aspect, the server 204 may be associated with an e-commerce firm selling one or more vehicle or other accessories.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, Bluetooth® low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 208, a Vehicle Control Unit (VCU) 210, and a navigation unit 212 (or unit 212). The VCU 210 may include a plurality of Electronic Control Units (ECUs) 214 disposed in communication with the automotive computer 208.

In some aspects, the user device 202 may be configured to connect with the automotive computer 208 and/or the unit 212 via the network 206, which may communicate via one or more wireless connection(s), and/or may connect with the vehicle 102 directly by using near field communication (NFC) protocols, Bluetooth® protocols, Wi-Fi, Ultra-Wide Band (UWB), and other possible data connection and sharing techniques.

The automotive computer 208 and/or the unit 212 may be installed anywhere in the vehicle 102, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing operations in accordance with the disclosure. The memory 218 may be a non-transitory computer-readable storage medium or memory storing a vehicle navigation program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle systems, connected servers (e.g., the server 204), the user device 202, and/or the like. The VCU 210 may include or communicate with any combination of the ECUs 214, such as, for example, a Body Control Module (BCM) 220, an Engine Control Module (ECM) 222, a Transmission Control Module (TCM) 224, a telematics control unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232 (or a detection unit). The vehicle sensory system 232 may include one or more vehicle sensors including, but not limited to, a Radio Detection and Ranging (RADAR or "radar") sensor configured for detection and localization of objects inside and outside the vehicle 102 using radio waves, sitting area buckle sensors, sitting area sensors, a Light Detecting and Ranging ("lidar") sensor, door sensors, proximity sensors, temperature sensors, wheel sensors, one or more ambient weather or temperature sensors, vehicle interior and exterior cameras, steering wheel sensors, etc. In some aspects, the vehicle sensory system 232 may be configured to capture inputs associated with the road 104 on which the vehicle 102 may be traveling (or a road in proximity to the vehicle 102). Specifically, the vehicle sensory system 232 may be configured to capture road images by using the vehicle exterior cameras. In further aspects, the vehicle sensory system 232 may be configured to capture inputs/images of objects or other vehicles that may be located on the road 104 or in proximity to the road 104.

In some aspects, the VCU 210 may control vehicle operational aspects and implement one or more instruction sets received from the server 204, the user device 202, from one or more instruction sets stored in the memory 218, including instructions operational as part of the unit 212.

The TCU 226 may be configured and/or programmed to provide vehicle connectivity to wireless computing systems onboard and off board the vehicle 102, and may include a Navigation (NAV) receiver 234 for receiving and processing a GPS signal, a BLE® Module (BLEM) 236, a Wi-Fi transceiver, a UWB transceiver, and/or other wireless transceivers (not shown in FIG. 2) that may be configurable for wireless communication (including cellular communication) between the vehicle 102 and other systems (e.g., a vehicle key fob (not shown in FIG. 2), the server 204, the user device 202, etc.), computers, and modules. The TCU 226 may be disposed in communication with the ECUs 214 by way of a bus. In some aspects, the TCU 226 may be configured to determine a real-time vehicle geolocation, e.g., via the NAV receiver 234.

The ECUs 214 may control aspects of vehicle operation and communication using inputs from human drivers, inputs from the automotive computer 208, the unit 212, and/or via wireless signal inputs received via the wireless connection(s) from other connected devices, such as the server 204, among others.

The BCM 220 generally includes integration of sensors, vehicle performance indicators, and variable reactors associated with vehicle systems, and may include processor-based power distribution circuitry that may control functions associated with the vehicle body such as lights, windows, security, camera(s), audio system(s), speakers, wipers, door locks and access control, various comfort controls, etc. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some aspects, the automotive computer 208 may connect with an infotainment system or a vehicle Human-Machine Interface (HMI) 238. The HMI 238 may include a touchscreen interface portion, and may include voice recognition features, biometric identification capabilities that may identify users based on facial recognition, voice recognition, fingerprint identification, or other biological identification means. In other aspects, the HMI 238 may be further configured to receive user instructions via the touchscreen interface portion, and/or output or display notifications, recommendations, navigation maps, etc. on the touchscreen interface portion.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered as limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 102, may include a transceiver 240, a processor 242, and a computer-readable memory 244.

The transceiver 240 may be configured to receive information/inputs from one or more external devices or systems, e.g., the user device 202, the server 204, and/or the like, via the network 206. Further, the transceiver 240 may transmit notifications, requests, signals, etc. to the external devices or systems. In addition, the transceiver 240 may be configured to receive information/inputs from vehicle components such as the vehicle sensory system 232, one or more ECUs 214, and/or the like. Further, the transceiver 240 may transmit signals (e.g., command signals) or notifications to the vehicle components such as the BCM 220, the HMI 238, and/or the like.

The processor 242 and the memory 244 may be same as or similar to the processor 216 and the memory 218, respectively. In some aspects, the processor 242 may utilize the memory 244 to store programs in code and/or to store data for performing operations in accordance with the disclosure. The memory 244 may be a non-transitory computer-readable storage medium or memory storing the vehicle navigation program code. In some aspects, the memory 244 may additionally store instructions/information/data obtained from the server 204, the user device 202, and/or the like.

In operation, the processor 242 may obtain inputs or images from the vehicle sensory system 232 when the vehicle 102 may be travelling on the road 104. Responsive to obtaining the inputs/images, the processor 242 may analyze the images and detect a presence of a fluid (e.g., the water 106) on the road 104 and a presence of an object (e.g., the overpass bridge 108) located in proximity to or over the water 106 based on the image analysis. Responsive to detecting the object presence, the processor 242 may determine an object height above the ground and/or an object distance "x" (as shown in FIG. 3) from the vehicle 102 based on the image analysis or other inputs (e.g., radar sensor inputs, lidar sensor inputs, and/or the like) obtained from the vehicle sensory system 232.

As described above in conjunction with FIG. 1, the processor 242 may determine the object height or the overpass bridge height based on analysis of images (captured by the vehicle exterior cameras) of the bridge height signage 110 that may be disposed on the overpass bridge 108. Responsive to determining the overpass bridge height, the processor 242 may determine the distance "D" (shown in FIG. 1) between the overpass bridge bottom portion and the water top level/portion based on the image processing/analysis. The processor 242 may further subtract the distance "D" from the overpass bridge height to calculate the water depth on the road 104 under the overpass bridge 108.

Figure 3:
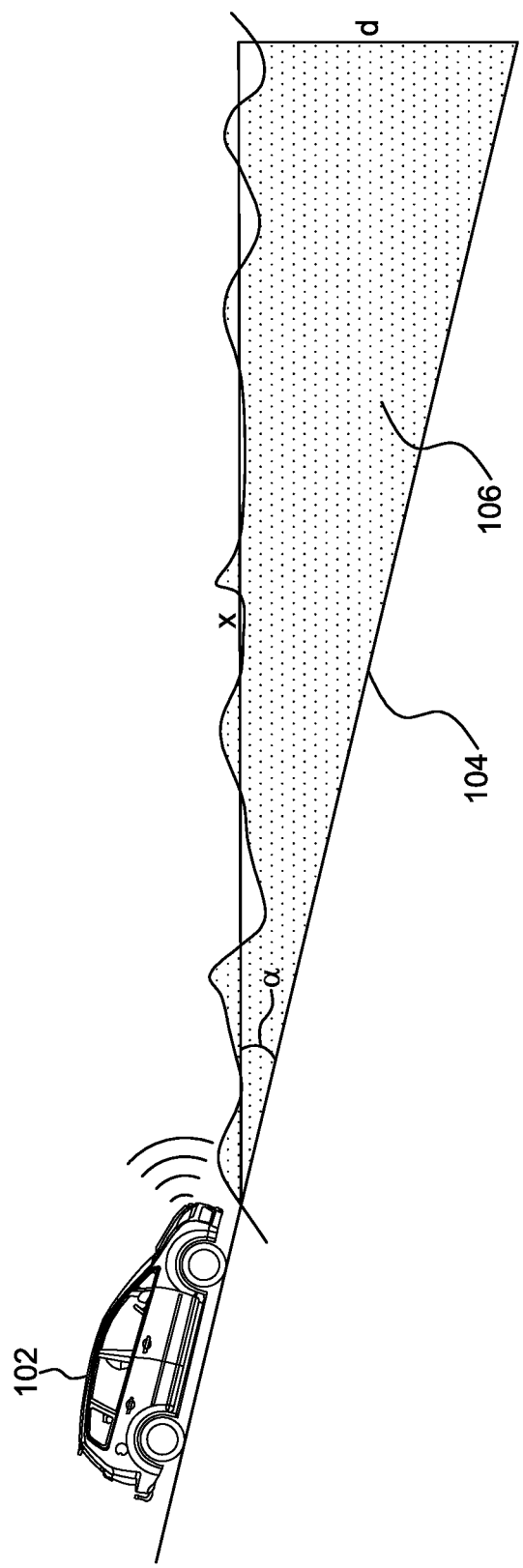
FIG. 3 depicts an example method for calculating water depth on a road in accordance with the present disclosure.

In additional or alternative aspects, the processor 242 may calculate the water depth on the road 104 based on the distance "x" of the vehicle 102 from the overpass bridge 108, when the vehicle 102 may be locating at an edge of the flooded water patch on the road 104, as shown in FIG. 3. In this case, the processor 242 may obtain inputs from a vehicle inclinometer or other sensors (or a vehicle sensor unit) included in the vehicle sensory system 232 that may be configured to determine a road inclination angle. Based on the obtained inputs, the processor 242 may determine that the road 104 may have an inclination angle of "α", as shown in FIG. 3. The processor 242 may then calculate a water depth "d" based on the road inclination angle "α" and the distance "x". Specifically, the processor 242 may calculate the water depth "d" as "x*tan α". As an example, if the road inclination angle "α" is 6 degrees and "x" is 35 feet, then the water depth "d" may be calculated as 3.7 feet.

Figure 4:
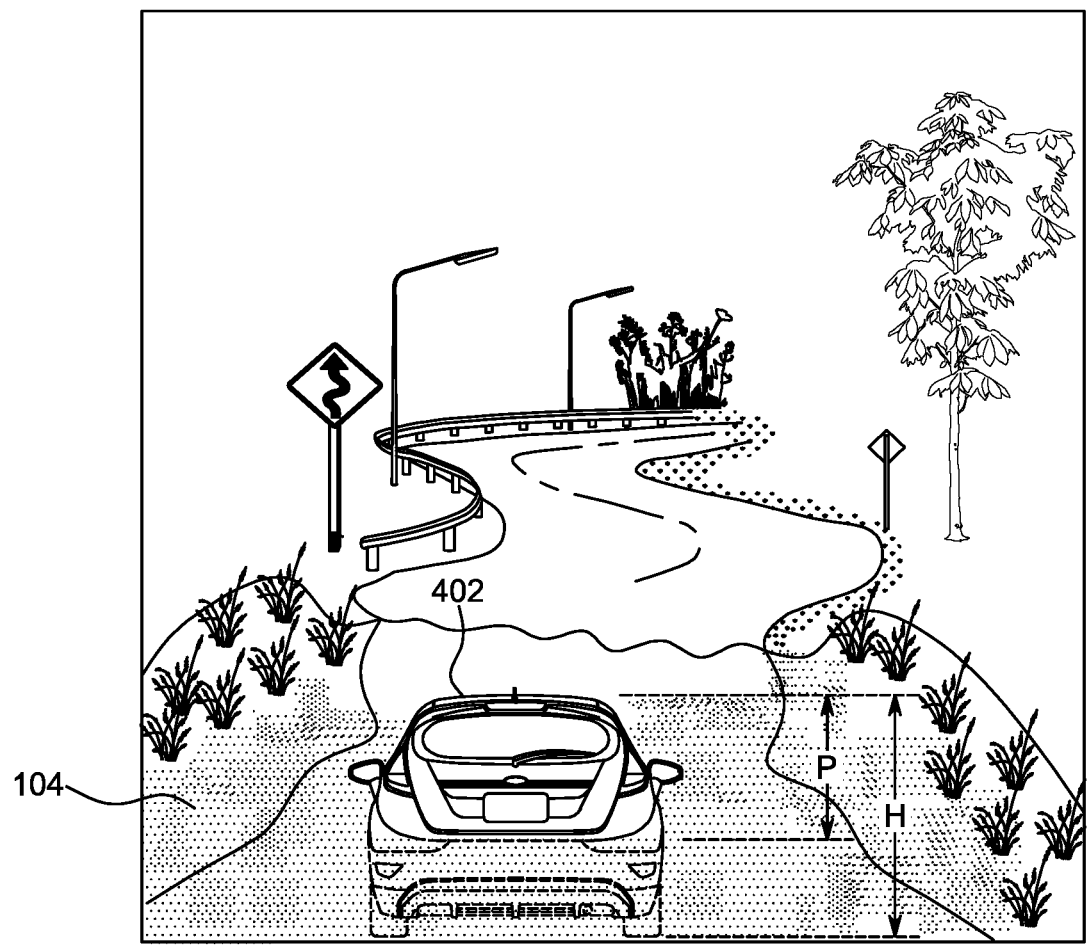
FIG. 4 depicts another example method for calculating water depth on a road in accordance with the present disclosure.

In additional or alternative aspects, the processor 242 may calculate the water depth on the road 104 by analyzing images of other vehicles (e.g., a vehicle 402 or a "second vehicle" as shown in FIG. 4) that may be travelling through the flooded road patch. In this case, the processor 242 may first estimate a vehicle height "H" by analyzing the images of the vehicle 402 when the vehicle 402 may be outside the water 106 (e.g., when the vehicle 402 may be just about to enter the water 106). Further, when the vehicle 402 may be travelling through the water 106, the processor 242 may determine a distance "P" between a vehicle top portion and the water top portion based on the analysis of the vehicle images obtained from the vehicle sensory system 232, as shown in FIG. 4. The processor 242 may then calculate the water depth by subtracting the distance "P" from the vehicle height "H".

In some aspects, the processor 242 may implement additional or alternative methods to determine the water depth. For example, the processor 242 may compare road images with and without the water 106 (i.e., flooded and non-flooded road images), captured at different times of the day/week, to determine the water depth. The processor 242 may obtain such road images at different times from the vehicle sensory system 232, the server 204, other vehicles on the road 104, and/or the like.

Responsive to calculating/determining the water depth by using one or more approaches/methods described above, the processor 242 may compare the water depth with the permissible vehicle navigation threshold or the predefined depth threshold of water on the road 104 through which the vehicle 102 may travel (without adversely affecting vehicle's performance). The predefined depth threshold associated with the vehicle 102 may be pre-stored in the memory 244 and/or obtained from the server 204.

Based on the comparison described above, the processor 242 may determine whether the water depth is greater or less than the predefined depth threshold. Responsive to determining that the water depth may be greater than the predefined depth threshold, the processor 242 may perform one or more first predefined actions, which may facilitate the vehicle 102 to prevent vehicle movement through the flooded road patch/water 106. On the other hand, responsive to determining that the water depth may be less than the predefined depth threshold, the processor 242 may perform one or more second predefined actions, which may facilitate the vehicle 102 to conveniently navigate the flooded road patch/water 106.

In some aspects, as part of the first predefined action, the processor 242 may output a vehicle stop notification to the user device 202 and/or the HMI 238, requesting or recommending the vehicle operator to stop the vehicle movement and not enter the flooded road patch/water 106. In further aspects, as part of the first predefined action, the processor 242 may autonomously stop the vehicle movement before the vehicle 102 enters the flooded road patch/water 106. In this case, if required, the vehicle operator may override the autonomous vehicle stop operation by applying throttle to the vehicle 102.

In additional aspects, the processor 242 may obtain the vehicle's destination location from the vehicle operator via the user device 202 and/or the HMI 238. As part of the first predefined action, the processor 242 may determine an alternative route from a vehicle real-time location (as determined via the NAV receiver 234) to the destination location, such that the alternative route prevents the vehicle movement through the flooded road patch/water 106. Responsive to determining the alternative route, the processor 242 may output the alternative route on the user device 202 and/or the HMI 238, so that the vehicle operator may drive the vehicle 102 via the alternative route. In some aspects, the processor 242 may autonomously move the vehicle 102 via the alternative route, when the vehicle 102 may be an autonomous vehicle.

Furthermore, as part of the second predefined action (i.e., when the water depth may be less than the predefined depth threshold), the processor 242 may output a caution notification to the user device 202 and/or the HMI 238, requesting or recommending the vehicle operator to drive the vehicle 102 cautiously through the flooded road patch/water 106, as there may be submerged objects in the water 106. In further aspects, as part of the second predefined action, the processor 242 may determine an optimal vehicle speed based on the calculated water depth and the mapping of maximum permissible vehicle speeds in flooded road conditions with different water depths (that may be obtained from the server 204 or pre-stored in the memory 244). Responsive to determining the optimal vehicle speed, the processor 242 may autonomously limit the vehicle speed to the optimal vehicle speed. In this case, the processor 242 may use the vehicle's GPS speed and not the vehicle wheel's speed, as the vehicle wheels may slip when the vehicle 102 travels through the flooded road patch/water 106. If required, the vehicle operator may override the optimal vehicle speed limit via the HMI 238 or by applying throttle to the vehicle 102.

In additional aspects, as part of the second predefined action, the processor 242 may output a predefined section/portion of a vehicle's user manual (that may be pre-stored in the memory 244) that may include best practices of driving through flooded roads. The vehicle operator may view/hear the best practices, and may accordingly drive the vehicle 102 through the flooded road patch/water 106.

In further aspects, as part of both the first and second predefined actions, the processor 242 may perform additional actions including, but not limited to, autonomously reducing the vehicle speed, disabling vehicle's cruise control feature, outputting the calculated water depth on the user device 202 and/or the HMI 238, transmitting/broadcasting a notification indicating the water presence on the road 104 and the calculated water depth to other vehicles/user devices that may be located on the road 104, and/or the like.

Furthermore, if the processor 242 is unable to calculate the water depth by using the methods/approaches described above, the processor 242 may output a notification to the user device 202 and/or the HMI 238, requesting the vehicle operator to stop and let other vehicles (e.g., the vehicle 402) to travel through the flooded road patch/water 106. When the vehicle 402 travels through the flooded road patch/water 106, the processor 242 may calculate the water depth by using the method described above. In additional aspects, when the processor 242 is unable to calculate the water depth, the processor 242 may determine and output/recommend a different route to the vehicle 102/vehicle operator that prevents vehicle movement through the flooded road patch/water 106, or may output a predefined message (e.g., "Don't drive through flooded road") on the user device 202 and/or the HMI 238 to dissuade the vehicle operator from driving through the flooded road patch/water 106.

The processor 242 may perform one or more additional actions to enhance vehicle operator convenience and/or convenience of other vehicles that may be located on the road 104. For example, when the vehicle 102 may be travelling on the road 104, the processor 242 may detect a presence of a vehicle (or a "third vehicle", not shown) that may be submerged in the flooded road patch/water 106 based on the inputs/images obtained from the vehicle sensory system 232. Responsive to such detection, the processor 242 may transmit, via the transceiver 240, an alert notification to the server 204. The alert notification may include a submerged vehicle location and/or its images. The firm operating the server 204 may arrange for the submerged vehicle's rescue, responsive to obtaining the alert notification from the processor 242/transceiver 240.

In further aspects, when the vehicle 102 may be equipped with an onboard scale, the processor 242 may adjust the permissible vehicle navigation threshold or the predefined depth threshold based on the onboard scale reading. For example, if the processor 242 determines that the vehicle 102 may be disposed two inches closer to the ground due to the loads being carried by the vehicle 102, the processor 242 may adjust (or reduce) the predefined depth threshold by two inches, so that the processor 242 may accurately decide whether to perform the first predefined action or the second predefined action based on the calculated water depth.

Furthermore, if the vehicle 102 includes a feature for adjusting ride/vehicle height or if the vehicle 102 is equipped with air springs or other means to adjust ride height, the processor 242 may automatically adjust the ride/vehicle height to the highest position, before the vehicle 102 travels through the flooded road patch/water 106.

In further aspects, if the vehicle 102 is equipped with a Particle Image Velocimetry (PIV), the processor 242 may obtain inputs from the PIV to determine a velocity of the water 106. If the determined water velocity may be greater than a predefined velocity threshold, the processor 242 may perform one or more actions from the first predefined actions described above.

In additional aspects, the processor 242 may enable the vehicle operator to purchase one or more accessories by accessing the server 204 (e.g., via the HMI 238). For example, the processor 242 may enable the vehicle operator to purchase snorkel kits, if the vehicle operator regularly travels through roads that are flooded.

In some aspects, the processor 242 may further output notifications or recommendations on the user device 202 or the HMI 238 that may be received from one or more external servers (e.g., associated with Government agencies). Such notifications or recommendations may include preset messages (e.g., "Turn around", "Don't drive through this road", etc.) that the Government agencies may desire the vehicle operators driving on the road 104 to hear/view. In further aspects, the processor 242 may perform the first predefined action even when the water depth may be less than the predefined depth threshold, when, e.g., the water current on the road 104 may be fast enough to wash the vehicle 102 away or the road may have washed away under the water that is being measured.

Although the description above is described in the context of a flooded road, the present disclosure may also be applied to other scenarios, e.g., during fun games requiring vehicle travel through water or streams, and/or the like.

Figure 5:
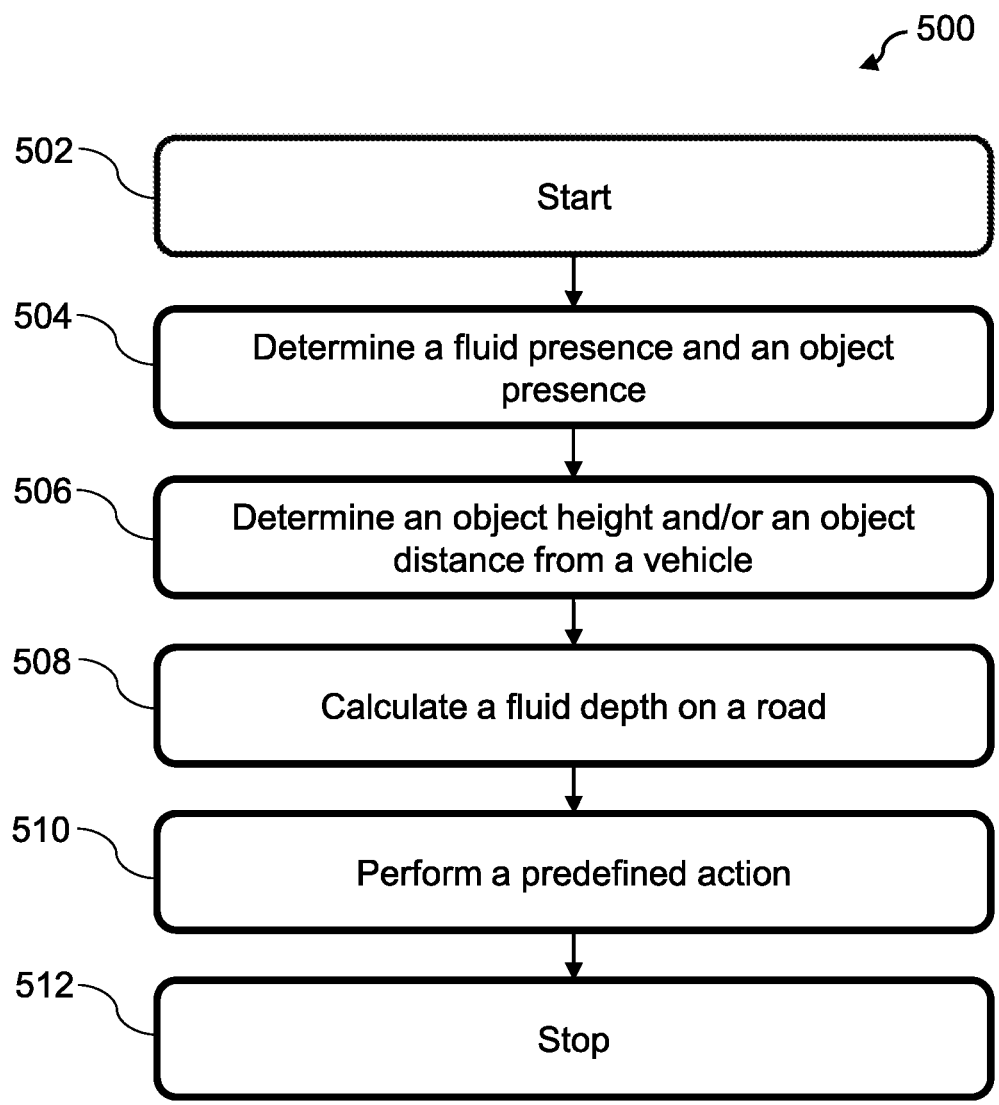
FIG. 5 depicts a flow diagram of an example method for facilitating vehicle navigation through a flooded road in accordance with the present disclosure.

FIG. 5 depicts a flow diagram of an example method 500 for facilitating vehicle navigation through a flooded road in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include determining, by the processor 242, the fluid/water presence on the road 104 and the object presence in proximity to the water 106 based on the inputs obtained from the vehicle sensory system 232. At step 506, the method 500 may include determining, by the processor 242, the object height and/or the object distance "x" from the vehicle 102 based on the inputs obtained from the vehicle sensory system 232.

At step 508, the method 500 may include calculating, by the processor 242, the water depth on the road 104 based on the object height and/or the object distance "x". At step 510, the method 500 may include performing, by the processor 242, the first predefined action when the water depth may be greater than the predefined depth threshold.

The method 500 may end at step 512.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A first vehicle comprising:
   a detection unit configured to capture inputs associated with a road in proximity to the first vehicle; and
   a processor communicatively coupled with the detection unit, wherein the processor is configured to:
      detect a presence of a fluid on the road and a presence of an object in proximity to the fluid based on the inputs captured by the detection unit;
      determine at least one of an object height or an object distance from the first vehicle based on the inputs, responsive to detecting an object presence;
      calculate a fluid depth on the road based on the at least one of the object height or the object distance; and
      perform a first predefined action responsive to determining that the fluid depth is greater than a depth threshold,
   wherein the object is a second vehicle travelling on the road through the fluid, and wherein the processor is further configured to:
      determine a second distance between a second vehicle top portion and a fluid top portion based on the inputs; and
      subtract the second distance from the object height to calculate the fluid depth.

2. The first vehicle of claim 1, wherein the object is an overpass bridge located above the fluid.

3. The first vehicle of claim 2, wherein the processor determines the object height based on a bridge height signage associated with the overpass bridge.

4. The first vehicle of claim 3, wherein the processor is further configured to:
   determine a first distance between an overpass bridge bottom portion and a fluid top portion disposed below the overpass bridge bottom portion based on the inputs; and
   subtract the first distance from the object height to calculate the fluid depth.

5. A first vehicle comprising:
   a detection unit configured to capture inputs associated with a road in proximity to the first vehicle; and
   a processor communicatively coupled with the detection unit, wherein the processor is configured to:
      detect a presence of a fluid on the road and a presence of an object in proximity to the fluid based on the inputs captured by the detection unit;
      determine at least one of an object height or an object distance from the first vehicle based on the inputs, responsive to detecting an object presence;
      calculate a fluid depth on the road based on the at least one of the object height or the object distance; and
      perform a first predefined action responsive to determining that the fluid depth is greater than a depth threshold,
   wherein the object is an overpass bridge located above the fluid, wherein the processor determines the object height based on a bridge height signage associated with the overpass bridge, and wherein the processor is further configured to:
      determine a first distance between an overpass bridge bottom portion and a fluid top portion disposed below the overpass bridge bottom portion based on the inputs; and
      subtract the first distance from the object height to calculate the fluid depth.

6. The first vehicle of claim 5, wherein the detection unit is a vehicle exterior camera, and wherein the inputs comprise images captured by the vehicle exterior camera.

7. The first vehicle of claim 5, wherein the fluid is water.

8. The first vehicle of claim 5 further comprising a vehicle sensor unit configured to determine a road inclination angle, wherein the processor is further configured to calculate the fluid depth based on the road inclination angle and the object distance.

9. The first vehicle of claim 5, wherein the processor is further configured to:
   detect a presence of a third vehicle submerged in the fluid based on the inputs; and transmit an alert notification to a server responsive to determining the presence of the third vehicle.

10. The first vehicle of claim 5, wherein the first predefined action comprises outputting a vehicle movement stop notification to a user device or a vehicle Human-Machine Interface (HMI).

11. The first vehicle of claim 5, wherein the first predefined action comprises reducing a first vehicle speed.

12. The first vehicle of claim 5, wherein the first predefined action comprises autonomously stopping a first vehicle movement.

13. The first vehicle of claim 5, wherein the first predefined action comprises determining an alternative vehicle route preventing a first vehicle movement through the fluid and outputting the alternative vehicle route on a user device or a vehicle HMI.

14. The first vehicle of claim 5, wherein the processor is further configured to:
   determine that the fluid depth is less than the depth threshold; and
   perform a second predefined action responsive to determining that the fluid depth is less than the depth threshold.

15. The first vehicle of claim 14, wherein the second predefined action comprises outputting a user caution notification to a user device or a vehicle HMI.

16. The first vehicle of claim 14, wherein the second predefined action comprises audibly outputting a predefined section of a vehicle owner manual to a user device or a vehicle HMI.

17. The first vehicle of claim 14, wherein the processor is further configured to determine an optimal vehicle speed based on the fluid depth, and wherein the second predefined action comprises autonomously limiting a first vehicle speed to the optimal vehicle speed.

18. A first vehicle comprising:
   a detection unit configured to capture inputs associated with a road in proximity to the first vehicle; and
   a processor communicatively coupled with the detection unit, wherein the processor is configured to:
      detect a presence of a fluid on the road and a presence of an object in proximity to the fluid based on the inputs captured by the detection unit;
      determine at least one of an object height or an object distance from the first vehicle based on the inputs, responsive to detecting an object presence;
      calculate a fluid depth on the road based on the at least one of the object height or the object distance; and
      perform a first predefined action responsive to determining that the fluid depth is greater than a depth threshold,
      perform a second predefined action responsive to determining that the fluid depth is less than the depth threshold,
      wherein the second predefined action comprises audibly outputting a predefined section of a vehicle owner manual to a user device or a vehicle HMI.

\* \* \* \* \*